US007957246B2

(12) United States Patent
Huang et al.

(10) Patent No.: US 7,957,246 B2
(45) Date of Patent: Jun. 7, 2011

(54) EXTERNAL OPTICAL DISK DRIVE ASSEMBLY

(76) Inventors: Chien Yi Huang, Taipei (TW); Yu-Shuo Li, Taipei (TW)

( * ) Notice: Subject to any disclaimer, the term of this patent is extended or adjusted under 35 U.S.C. 154(b) by 1619 days.

(21) Appl. No.: 11/008,322

(22) Filed: Dec. 10, 2004

(65) Prior Publication Data
US 2006/0020953 A1    Jan. 26, 2006

(30) Foreign Application Priority Data

Jul. 20, 2004  (TW) .............................. 93211439 U

(51) Int. Cl.
*G11B 33/02* (2006.01)
(52) U.S. Cl. ................................ 369/75.11; 361/679.33

(58) Field of Classification Search ............... 369/13.15, 369/75.11, 75.21, 77.11; 720/600; 361/736, 361/685, 679.33
See application file for complete search history.

(56) References Cited

U.S. PATENT DOCUMENTS
2005/0248916 A1*  11/2005  Huang ..................... 361/685
* cited by examiner

*Primary Examiner* — Ali Neyzari
(74) *Attorney, Agent, or Firm* — Davis Wright Tremaine LLP

(57) ABSTRACT

The present invention discloses an external optical disk drive assembly, which comprises a slim internal optical disk drive including a first transmission port; and an external module being disposed outside the slim internal optical disk drive and electrically coupled to the first transmission port, so that the slim internal optical disk drive is converted into the external optical disk drive, characterized in that the external module is disposed within the area covered by the slim internal optical disk drive.

22 Claims, 4 Drawing Sheets

EXTERNAL OPTICAL DISK DRIVE ASSEMBLY

FIELD OF THE INVENTION

The present invention relates to an external optical disk drive, more particularly to an external optical disk drive that uses a slim internal optical disk drive, a circuit adapter and a flexible transmission line to convert the slim internal optical disk drive into an external optical disk drive within the area occupying the the slim internal optical disk drive.

BACKGROUND OF THE INVENTION

If a traditional slim internal optical disk drive is converted into an external optical disk drive, it is necessary to install an adapter circuit board 20 having an adapter circuit as shown in FIG. 1. The adapter circuit board 20 is inserted into an IDE interface of the slim internal optical disk drive 10. Since the connection adopts an extended external insertion, therefore it will increase the area covered by the slim internal optical disk drive 10, such that the overall area of the external optical disk drive 30 will be increased. Although the measure taken by the adapter circuit 20 shown in FIG. 1 can still achieve the circuit conversion purpose, it has the shortcoming of causing a substantial increase to the overall area, which is undoubtedly inapplicable to the slim, thin, short and compact design requirements of the external optical disk drive 30.

In view of the foregoing shortcomings of the measure taken in the prior art, the inventor of the present invention thought of an innovative idea to overcome the shortcomings and finally invented an external optical disk drive assembly, which converts a slim internal optical disk into an external optical disk drive within the area covered by the slim internal optical disk drive.

SUMMARY OF THE INVENTION

Therefore, the primary objective of the present invention is to provide an external optical disk drive assembly, such that a slim internal optical disk drive can be converted into an external optical disk drive, and the conversion is implemented within the area covered by the original slim internal optical disk drive.

To achieve the foregoing objective, the present invention provides an external optical disk drive assembly that comprises a slim internal optical disk drive including a first transmission port; and an external module being disposed outside the slim internal optical disk drive and electrically coupled to the first transmission port, so that the slim internal optical disk drive is converted into the external optical disk drive, characterized in that the external module is disposed within the area covered by the slim internal optical disk drive.

BRIEF DESCRIPTION OF THE DRAWINGS

The above objects and advantages of the present invention will become more apparent with reference to the appended drawings wherein.

DETAILED DESCRIPTION OF THE INVENTION

Figure 1:
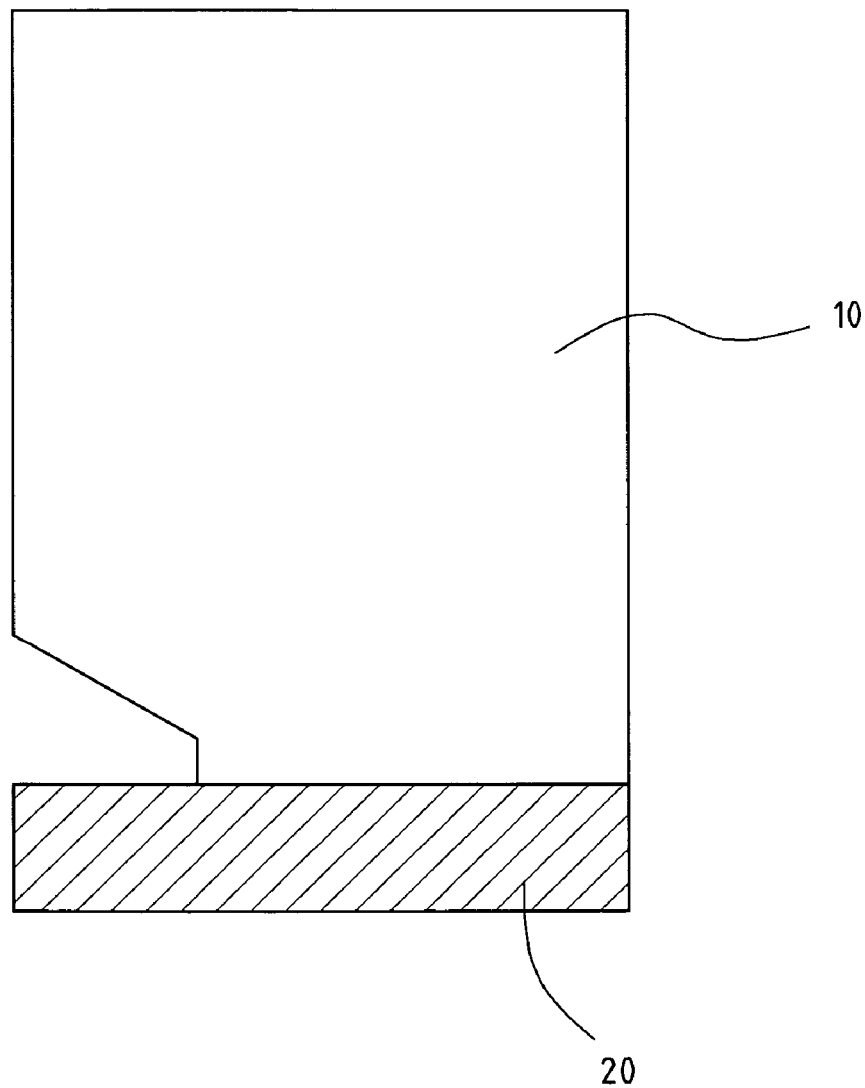
FIG. 1 is an illustrative view of the structure of a prior-art external optical disk drive.
Figure 2:
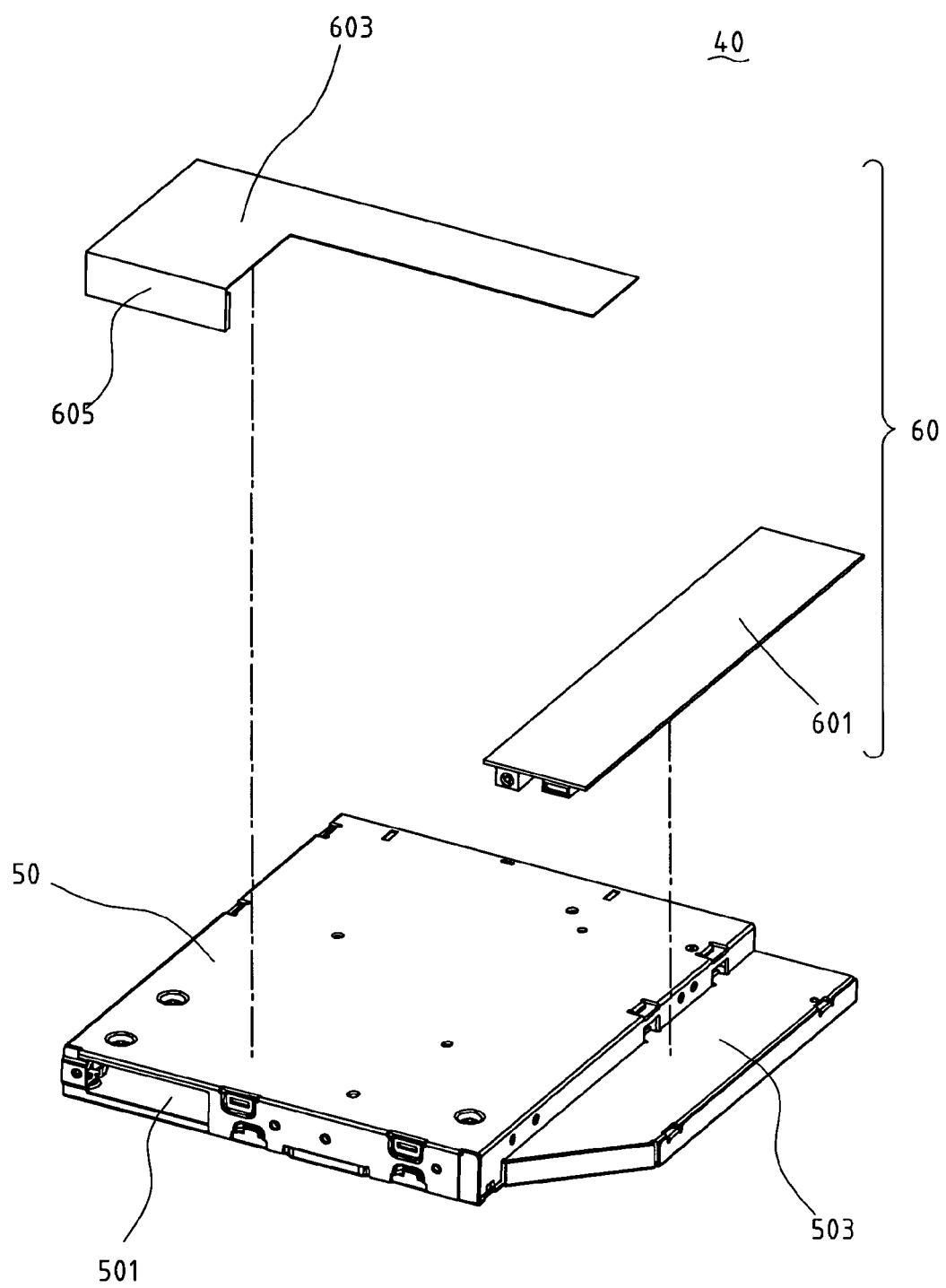
FIG. 2 is an exploded view of the external optical disk drive assembly of the present invention.

Please refer to FIG. 2 for the exploded view of an external optical disk drive assembly of the present invention. In FIG. 2, the external optical disk drive assembly 40 comprises a slim internal optical disk drive 50 and an external module 60; wherein the external module 60 is coupled to a first transmission port 501 of the slim internal optical disk drive 50, and the external module 60 comprises an adapter circuit board 601 and a transmission line 603. The most significant technical characteristic of the present invention resides on the external module 60 not exceeding the area covered by the slim internal optical disk drive 50 after the external module 60 is connected to the slim internal optical disk drive 50. In other words, the assembly 40 of the present invention will maintain the area and scale of the slim internal optical disk drive 50 without being affected by the additional installation of the external module 60 or increasing the area covered by the external optical disk drive after the connection is made.

Figure 3:
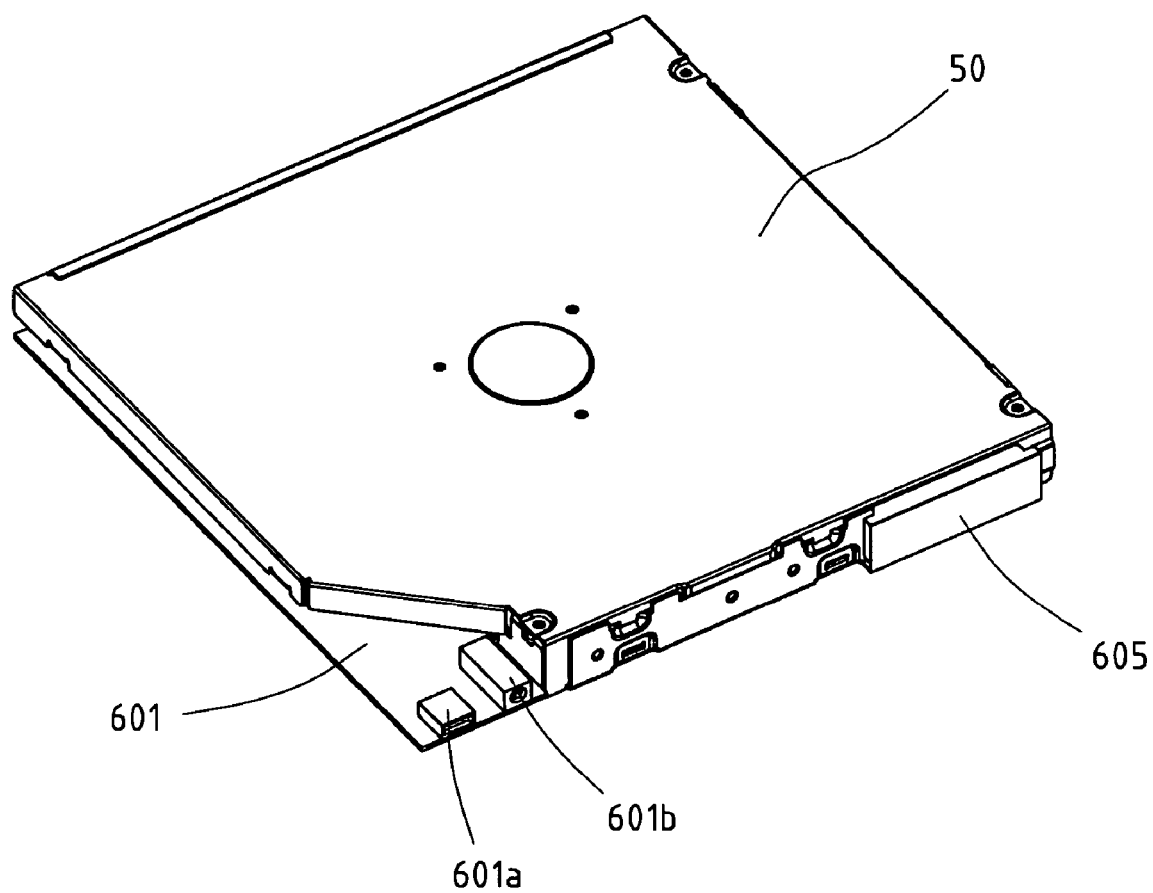
FIG. 3 is a perspective view the external optical disk drive assembly of the present invention.
Figure 4:
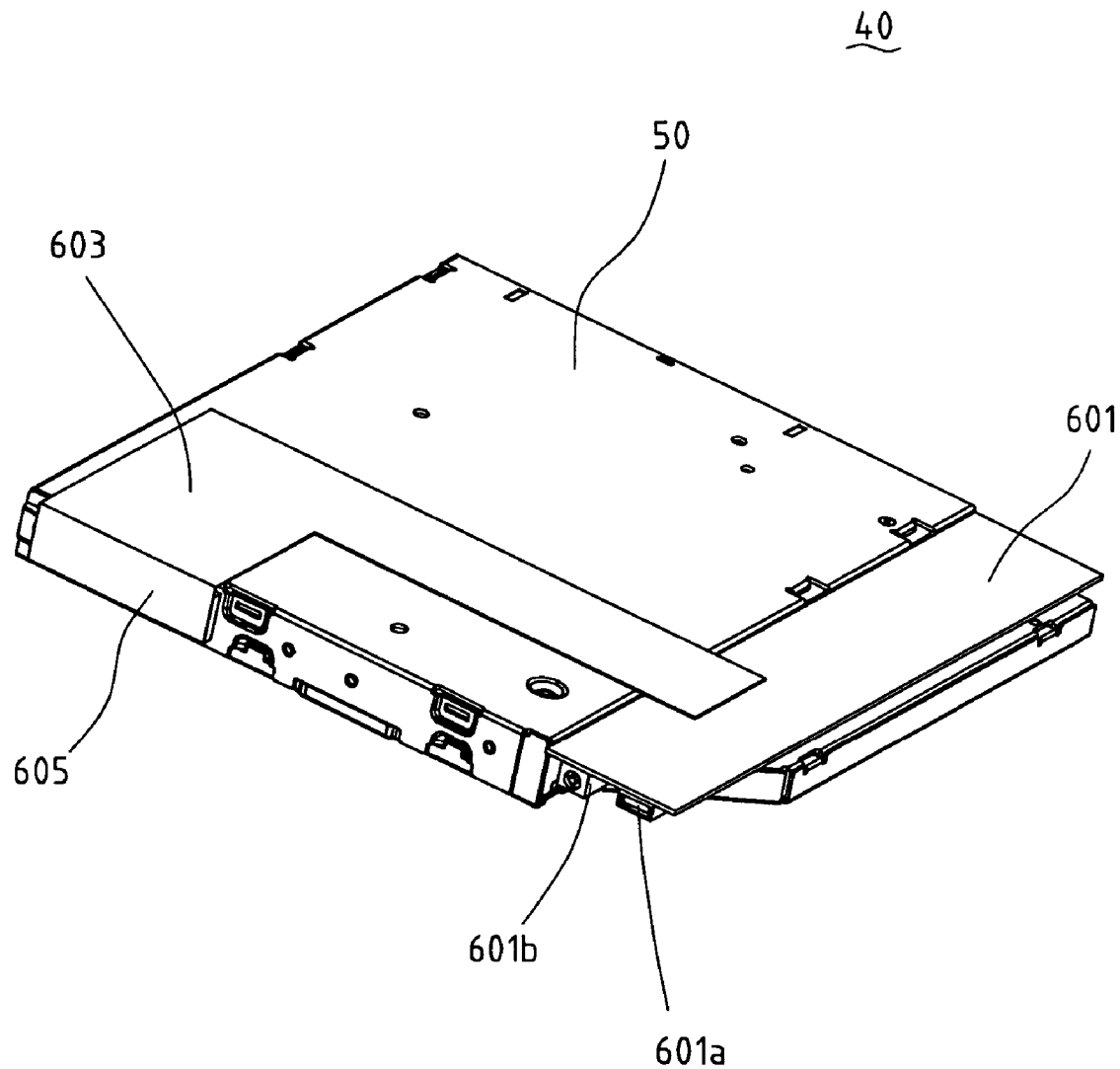
FIG. 4 is a bottom view of the external optical disk drive assembly of the present invention.

Please refer to FIGS. 3 and 4 for the perspective view and the bottom view of the external optical disk drive assembly of the present invention respectively. In the installation, one end of a transmission line 603 is connected to a third transmission port 605, and the third transmission port 605 is connected to a first transmission port 501. The other end of the transmission line 603 is connected to an adapter circuit board 601 by soldering or connecting to a connector. To cope with the different positions of the first transmission port 501 and the adapter circuit board 601, the transmission line 603 is designed in a curved shape for being attached closely on the housing of the slim internal optical disk drive 50, such that the transmission line 603 can connect the first transmission port 501, the third transmission port 605 and the adapter circuit board 601 easily. The adapter circuit board 601 can be mounted into a recession 503 of the slim internal optical disk drive 50 to fully utilize the space of the slim internal optical disk drive 50.

The specific configuration of the first transmission port 501 of the slim internal optical disk drive 50 is an IDE interface, and thus the third transmission port 605 of the preferred embodiment can adopt the IDE connector corresponding to such IDE interface. The adapter circuit board 601 comprises a second transmission port 601a. In general, the second transmission port 601a of the preferred embodiment adopts a USB interface, and thus the second transmission port 601a can adopt a USB connector for the external connection through a USB cable. If one end of the USB cable is connected to the second transmission port 601a and the other end of the USB cable is connected to the computer, then the external module 60 is available for the external connection without increasing the area, and such arrangement can convert a slim internal optical disk drive 50 into an external optical disk drive.

In addition to the second transmission port 601a adopting the USB interface, the second transmission port 601a also can adopt an IEEE1394 interface, a SATA interface or other interfaces.

Further, the adapter circuit board 601 comprises a power supply socket 601b to be connected to an external power supply. Of course, the adapter circuit board 601 also includes other related circuits such as the IDE-USB interface conversion circuit, but these related circuits are well known to the persons skilled in the art, and thus will not be described here.

The transmission line 603 of the present invention adopts a soft circuit board, a flexible flat cable, and a flexible electric cable, etc.

In summation of the description above, the external optical disk drive assembly of the present invention has the following improvements and advantages:

1. The present invention changes the circuit conversion of the prior-art slim optical disk drives and uses the space of the existing structure of the slim internal optical disk drive to accommodate the circuit adapter. Therefore, the slim internal optical disk drive can be converted into an external optical disk drive within the area of the slim internal optical disk drive and without changing the existing structure of the slim internal optical disk drive; and 2. The property of the flexible transmission line of the present invention allows the slim internal optical disk drive to be electrically connected with the external optical disk drive, and thus the position for installing the circuit conversion card will not be affected, and the circuit adapter can be installed and fixed within the area covered by the slim internal optical disk drive.

While the invention has been described by means of specific embodiments, numerous modifications and variations could be made thereto by those skilled in the art without departing from the scope and spirit of the invention set forth in the claims.

What is claimed is:

1. An external optical disk drive assembly, comprising:
    an internal optical disk drive assembly, comprising a first port and a periphery, wherein a minimum bounding rectangular box defined along a portion of the periphery of the internal optical disk drive assembly encloses the internal optical disk drive assembly, and defines a smallest possible volume which contains the internal optical disk drive assembly;
    an adapter circuit board positioned outside the internal optical disk drive assembly, and entirely within the minimum bounding rectangular box defined along the portion of the periphery of the internal optical disk drive assembly; and
    a communication link electrically coupling the adapter circuit board to the first port of the internal optical disk drive assembly thereby converting the internal optical disk drive assembly into the external optical disk drive assembly.

2. The external optical disk drive assembly of claim 1, wherein the adapter circuit board further comprises a second port couplable to an external electric cable.

3. The external optical disk drive assembly of claim 1, wherein the communication link comprises a first end portion and a second end portion;
    the adapter circuit board comprises a second port coupled to the first end portion of the communication link, and
    the second end portion of the communication link is coupled to the first port of the internal optical disk drive assembly.

4. The external optical disk drive assembly of claim 1, wherein the communication link is a soft circuit board, a flexible flat cable, or a flexible electric cable.

5. The external optical disk drive assembly of claim 2, wherein the second port of the adapter circuit board is a universal serial bus ("USB") connector and the external cable is a USB cable.

6. The external optical disk drive assembly of claim 2, wherein the second port of the adapter circuit board is an IEEE1394 connector and the external cable is an IEEE1394 cable.

7. The external optical disk drive assembly of claim 2, wherein the second port of the adapter circuit board is an SATA connector, and the external cable is a SATA cable.

8. The external optical disk drive assembly of claim 1, wherein the internal optical disk drive assembly is a slim internal optical disk burner.

9. The external optical disk drive assembly of claim 1, wherein the adapter circuit board comprises a power supply socket.

10. The external optical disk drive assembly of claim 1, wherein the communication link has a first portion positioned inside the minimum bounding rectangular box and a second portion positioned outside the minimum bounding rectangular box defined along the portion of the periphery of the internal optical disk drive assembly.

11. The external optical disk drive assembly of claim 1, wherein the internal optical disk drive assembly comprises:
    a first edge portion, wherein the first port is positioned along the first edge portion and accessible from outside the internal optical disk drive assembly; and
    a second edge portion different from the first edge portion, wherein the adapter circuit board is adjacent the second edge portion.

12. The external optical disk drive assembly of claim 11, wherein the internal optical disk drive assembly further comprises a recess formed along the second edge portion, and the adapter circuit board is positioned inside the recess.

13. The external optical disk drive assembly of claim 11, wherein the second edge portion of the internal optical disk drive assembly comprises a notched portion, and the adapter circuit board further comprises a second port accessible from outside the external optical disk drive assembly positioned inside the notched portion.

14. The external optical disk drive assembly of claim 11, wherein the internal optical disk drive assembly further comprises a housing having an outer surface and the communication link is attached to the outer surface of the housing and extends along the outer surface of the housing between the adapter circuit board and the first port of the internal optical disk drive assembly.

15. A method of modifying an internal optical disk drive assembly to construct an external optical disk drive assembly, the internal optical disk drive assembly having a recess and a port spaced apart from the recess, the port being accessible from outside the internal optical disk drive assembly, the method comprising:
    mounting an adapter circuit board inside the recess;
    coupling a first end portion of a communication link to the port of the internal optical disk drive assembly; and
    coupling a second end portion of the communication link to the adapter circuit board.

16. The method of claim 15, further comprising:
    attaching a portion of the communication link between its first and second end portions to the internal optical disk drive assembly.

17. The method of claim 15, wherein coupling the second end portion of the communication link to the adapter circuit board comprises soldering the second end portion of the communication link to the adapter circuit board.

18. The method of claim 15, wherein the adapter circuit board comprises a connector and coupling the second end portion of the communication link to the adapter circuit board comprises connecting the second end portion of the communication link to the connector of the adapter circuit board.

19. An internal optical disk drive assembly adapted for use as an external optical disk drive assembly, the internal optical disk drive assembly comprising a port accessible from outside the internal optical disk drive assembly, and a periphery, a minimum bounding rectangular box being defined along a portion of the periphery of the internal optical disk drive assembly, the minimum bounding rectangular box enclosing the internal optical disk drive assembly and defining a smallest possible volume which contains the internal optical disk drive assembly, the adapted internal optical disk drive assembly comprising:
   means for attaching an adapter circuit board to the internal optical disk drive assembly;
   means for positioning the adapter circuit board completely inside the minimum bounding rectangular box defined along the periphery of the internal optical disk drive assembly; and
   means for electrically connecting the adapter circuit board to the port of the internal optical disk drive.

20. The external optical disk drive assembly of claim 19, wherein the means for electrically connecting the adapter circuit board to the port is positioned at least partially inside the minimum bounding rectangular box defined along the portion of the periphery of the internal optical disk drive assembly.

21. The external optical disk drive assembly of claim 19, further comprising:
   means for establishing a communication link between the adapter circuit board and a computer.

22. The external optical disk drive assembly of claim 19, further comprising:
   means for connecting the adapter circuit board to a power supply.

* * * * *

UNITED STATES PATENT AND TRADEMARK OFFICE
CERTIFICATE OF CORRECTION

PATENT NO.       : 7,957,246 B2                                                   Page 1 of 1
APPLICATION NO.  : 11/008322
DATED            : June 7, 2011
INVENTOR(S)      : Huang et al.

It is certified that error appears in the above-identified patent and that said Letters Patent is hereby corrected as shown below:

Column 3, line 28, in Claim 1, delete "assembly," and insert -- assembly --.

Column 3, line 29, in Claim 1, delete "assembly," and insert -- assembly --.

Column 6, line 1, in Claim 20, delete "The external optical disk drive assembly of claim 19," and insert -- The internal optical disk drive assembly of claim 19, --.

Column 6, line 7, in Claim 21, delete "The external optical disk drive assembly of claim 19," and insert -- The internal optical disk drive assembly of claim 19, --.

Column 6, line 11, in Claim 22, delete "The external optical disk drive assembly of claim 19," and insert -- The internal optical disk drive assembly of claim 19, --.

Signed and Sealed this
Third Day of July, 2012

David J. Kappos
*Director of the United States Patent and Trademark Office*